United States Patent

Mueller et al.

[11] Patent Number: 5,669,675
[45] Date of Patent: Sep. 23, 1997

[54] ELECTROMAGETICALLY ACTUATED VALVE FOR SLIP-CONTROLLED HYDRAULIC BRAKE SYSTEMS IN MOTOR VEHICLES

[75] Inventors: Klaus Mueller, Tamm; Bernhard Heugle, Grossbottwar; Kurt Herzog, Bietigheim-Bissingen; Martin Oehler, Leingarten; Günther Hohl, Stuttgart; Hans-Jürgen Herderich, Kernen, all of Germany

[73] Assignee: Robert Bosch GmbH, Stuttgart, Germany

[21] Appl. No.: 617,931

[22] PCT Filed: Sep. 21, 1994

[86] PCT No.: PCT/DE94/01099

§ 371 Date: Mar. 25, 1996

§ 102(e) Date: Mar. 25, 1996

[87] PCT Pub. No.: WO95/08463

PCT Pub. Date: Mar. 30, 1995

[30] Foreign Application Priority Data

Sep. 23, 1993 [DE] Germany .............. 43 32 372.3

[51] Int. Cl.$^6$ .............. B60T 8/36; B60T 8/50; F16K 31/06; G05D 16/20
[52] U.S. Cl. .................. 303/119.2; 303/900
[58] Field of Search .............. 303/119.2, 119.1, 303/113.1, 900, 901; 137/596.17; 251/129.15, 129.02, 129.01, 129.22

[56] References Cited

U.S. PATENT DOCUMENTS

| | | | |
|---|---|---|---|
| 5,076,538 | 12/1991 | Mohr et al. | 303/119.2 |
| 5,167,442 | 12/1992 | Alaze et al. | 303/119.2 |
| 5,203,617 | 4/1993 | Wilde | 303/119.2 |
| 5,218,996 | 6/1993 | Schmitt-Matzon | 137/596.17 |
| 5,335,984 | 8/1994 | Alaze et al. | 303/119.2 |
| 5,370,450 | 12/1994 | Volz et al. | 303/119.2 |
| 5,402,824 | 4/1995 | Hosoya et al. | 303/119.2 |
| 5,423,602 | 6/1995 | Takahashi et al. | 303/119.2 |
| 5,425,575 | 6/1995 | Schmidt et al. | 303/119.2 |

FOREIGN PATENT DOCUMENTS

| | | |
|---|---|---|
| 2909768 | 9/1980 | Germany . |
| 3607693 | 9/1987 | Germany . |
| 3802648 | 8/1989 | Germany . |
| 3934711 | 3/1991 | Germany . |
| 4035817 | 5/1992 | Germany . |
| 2185299 | 7/1987 | United Kingdom . |
| 9204214 | 3/1992 | WIPO . |

*Primary Examiner*—Douglas C. Butler
*Attorney, Agent, or Firm*—Edwin E. Greigg; Ronald E. Greigg

[57] ABSTRACT

An electromagnetic valve having a magnet armature which can be moved longitudinally in a valve dome and the valve tappet of which carries a closing member of a first seat valve, which valve is open in the rest position. The first seat valve is situated in a valve chamber, from which first and second pressure-medium passages lead to first and second chambers arranged axially at both ends of the magnet armature. The connection between the first control chamber, which is remote from the closing member, and the second chamber, which is close to the closing member, is controlled by the magnet armature by a second seat valve, which is open in the rest position. When the second seat valve assumes its closed position, the pressure in the first control chamber, which is remote from the closing member, brings about a displacement of the magnet armature counter to the force of a return spring, resulting in a reduction in the cross section of flow of the first seat valve. The aim is to achieve automatic setting—which is effective following a closed position of the valve—of a reduced section of flow. The valve can be used in slip-controlled hydraulic brake systems of motor vehicles.

7 Claims, 1 Drawing Sheet

5,669,675

ELECTROMAGETICALLY ACTUATED VALVE FOR SLIP-CONTROLLED HYDRAULIC BRAKE SYSTEMS IN MOTOR VEHICLES

PRIOR ART

The invention relates to an electromagnetically actuated valve, particularly for slip-controlled hydraulic brake systems in motor vehicles.

A valve of this kind is disclosed by DE 39 34 771 C1, FIG. 3. It has a control piston which is arranged in the valve dome, forms a stop for the magnet armature and is guided in longitudinally displaceable fashion on a stud which emanates from the valve body and passes through the magnet armature. With its end remote from the armature, the control piston delimits a control chamber which is connected to the pressure-medium inlet of the known valve by a pressure-medium passage which passes coaxially through the stud and the control piston. While the magnet armature is pressure-balanced at both ends, pressure fed into the control chamber can displace the control piston axially against a stop. The stroke of the magnet armature is thereby reduced by a predetermined amount, resulting in a restriction of the flow cross section.

This action of the known valve can be used in slip-controlled hydraulic brake systems, in which the pressure-medium inlet is connected to the brake master cylinder and the pressure-medium outlet is connected to a wheel brake cylinder. If, for example, during a brake-slip control operation, the valve is switched to its closed position by excitation of the solenoid and, during reduction of the pressure in the wheel brake cylinder, a sufficient pressure drop is generated between the pressure-medium inlet and the pressure-medium outlet, this brings about the above-described displacement of the control piston with the consequence that, when the valve is opened, the abovementioned restriction of the cross section of flow comes into effect and this persists for as long as the pressure difference between the inlet and the outlet exists. Because of the reduced pressure gradient during the pressure build-up which follows a pressure reduction in a brake-slip control operation, the reduction in the cross section of flow has an advantageous effect on the quality of control and noise characteristics of the brake system. During a normal braking operation without the risk of lock-up, on the other hand, the full cross section of flow of the valve is available, favoring a short response time of the brake system upon brake actuation, which is desirable.

However, in the case of the known valve, the fixed setting of the restricted cross section of flow is disadvantageous because, as a result, the flow rate is subject to fluctuations dependent on the differential pressure. In addition, the flow rate is considerably dependent on the absolute size of the cross section of flow, i.e. the stop must be very narrowly toleranced. Due to the requirement for a control piston, the valve is furthermore relatively expensive.

ADVANTAGES OF THE INVENTION

In contrast, the valve according to the invention has the advantage that, given a sufficiently large pressure drop between the inlet and the outlet side of the valve, the cross section of flow of the first seat valve with the second seat valve closed adjusts automatically as a function of the forces acting on the armature, but without a magnetic force, to largely constant flow rates lower than when the first seat valve is fully open. The outlay on construction to achieve this action of the valve according to the invention as a flow control valve is extremely low.

Advantageous further developments and improvements of the valve specified herein are possible by means of the measures presented hereinafter.

It is particularly advantageous as regards costs and functional reliability to construct the second seat valve with just one component interacting with the valve seat, the elasticity of this component being exploited to maintain the closed position over a certain stroke range of the magnet armature.

The guidance of the pressure-medium jet into the space bounded by the baffle element furthermore proves advantageous because the back pressure generated in this way increases the pressure drop acting on the magnet armature.

BRIEF DESCRIPTION OF THE DRAWING

An exemplary embodiment of the invention is illustrated in simplified form in the drawing and described in greater detail in the description which follows. FIGS. 2 to 4 are all in section and on a different scale to FIG. 1.

DETAILED DESCRIPTION OF THE EXEMPLARY EMBODIMENT

Figure 1:
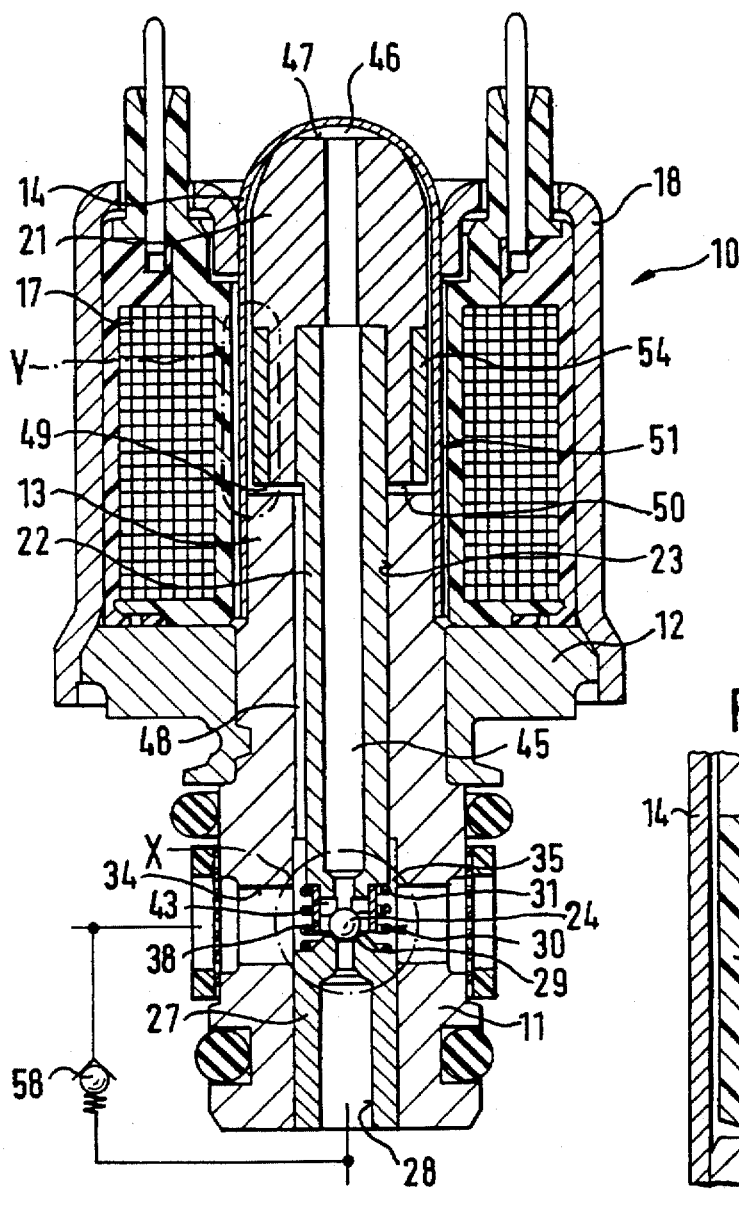
FIG. 1 shows a longitudinal section through an electromagnetically actuated valve.

An electromagnetically actuated valve 10 has a valve housing 11 which is intended to be accommodated in a valve block (not shown) and is rigidly connected to a yoke disk 12 (FIG. 1). The valve housing 11 is continued beyond the yoke disk 12 by a pole core 13. A tubular valve dome 14 is pushed onto the pole core 13. It is connected tightly to the pole core 13 by welding. At the end remote from the pole core, the valve dome 14 has a hemispherical end.

The valve dome 14 is surrounded by an annular solenoid 17. A bell-shaped housing 18 surrounds the solenoid 17. At one end, the housing 18 engages on the valve dome 14; at the other end, it is connected to the yoke disk 12.

An essentially circular-cylindrical magnet armature 21 is accommodated in longitudinally movable fashion in the valve dome 14, which is closed at the coil end. Emanating from the magnet armature 21 is a valve tappet 22 rigidly connected to it. The valve tappet 22 is accommodated with play in a longitudinal hole 23 in the valve housing 11. At its end remote from the armature, the valve tappet 22 carries a closing member 24 of spherical design. The closing member 24, which, in the exemplary embodiment, is designed as a solid ball, is joined to the valve tappet 22. As a departure from the exemplary embodiment, the closing member 24 can also take the form of a hemisphere or of a cone or truncated cone at the end remote from the armature.

A sleeve-shaped valve body 27 with a stepped hole 28 which opens into a valve seat 29 is pressed into that section of the longitudinal hole 23 which is remote from the armature. The valve seat 29 is designed as a conical counter sink with an angle of taper of preferably 90°. The closing member 24 and the valve seat 29 form a first seat valve 30 of the electromagnetically actuated valve 10. With the solenoid 17 unexcited, the first seat valve 30 assumes its open position as a rest position due to the action of a preloaded return spring 31 engaging, the valve tappet 22 and, the valve body 27.

The valve housing 11 is provided with a transverse hole 34 which crosses the longitudinal hole 23 at right angles. A valve chamber 35 which accommodates the first seat valve 30 is formed in the region where the two holes 23 and 34 meet. On the one hand, the valve chamber 35 is connected via the valve seat 29 and the stepped hole 28 to a pressure-medium inlet; on the other hand, a pressure-medium outlet formed by the transverse hole 34 is connected to the valve chamber.

Figure 2:
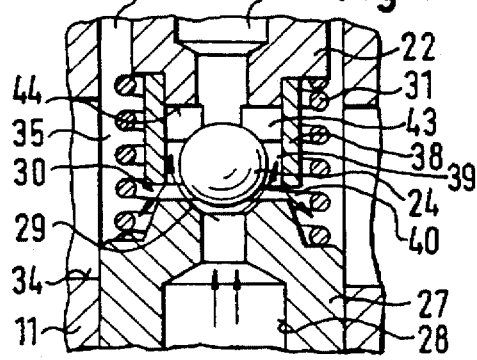
FIG. 2 shows a detail, indicated by X in FIG. 1, in the area of a seat valve.

In addition to the first seat valve 30 and the return spring 31, the valve chamber 35 also contains a baffle element 38 for pressure medium (FIG. 2). The baffle element 38 is of sleeve-shaped design and secured on the valve tappet 22, extending coaxially with the latter. The baffle element 38 surrounds the closing member 24 of the first seat valve 30, forming a radial gap 39, and extends to within a short distance of the valve body 27, thereby forming an axial gap 40, as can clearly be seen from FIG. 2. In the rest position of the valve 10, the axial gap 40 is larger than the valve stroke, i.e., in the closed position of the first seat valve 30, which constitutes the working position of the valve 10 and in which the closing member 24 engages on the valve seat 29, the axial gap 40 is reduced to a minimum size.

The baffle element 38 divides a subchamber 43 from the valve chamber 35. This valve subchamber 43 is connected by a transverse slot 44, situated at a point remote from the valve seat, in the valve tappet 22 to a first pressure-medium passage 45 designed as a longitudinal hole passing right through the valve tappet and the magnet armature 21. The first pressure-medium passage 45 leads to a control chamber 46 situated between the end 47 of the magnet armature 21 remote from the closing member and the hemispherical end of the valve dome 14. Starting from the valve chamber 35, outside the baffle element 38, there is furthermore a second pressure-medium passage 48 formed by a flat on the valve tappet 22, the cross section of which is otherwise circular. This passage ends in a balance chamber 49 which is arranged between that end 50 of the magnet armature 21 which is close to the closing member and the pole core 13 of the valve 10. In the illustrated rest position of the valve 10, the control chamber 46 and the balance chamber 49 are connected to one another along the circumferential surface of the magnet armature 21 to allow the transmission of a pressure medium. This connection is controlled by means of a second seat valve 51.

Figure 3:
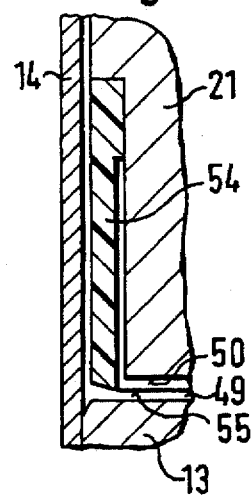
FIG. 3 shows a detail, indicated by Y in FIG. 1, of another seat valve.

The seat valve 51 comprises, as a closing element 54, a straight hollow cylinder mounted coaxially on the circumference of the magnet armature 21 and interacting with the pole core 13 as the valve seat (FIG. 3). In the area remote from the pole core, the closing element 54 is held on the magnet armature 21 by a press fit. In the remaining area, the closing element 54 extends with a clearance along the magnet armature 21 and, projecting beyond the end 50 of the armature close to the closing member, ends in a sealing knife edge 55. The distance by which it projects amounts to about half the stroke of the magnet armature during the operation of the valve 10. The closing element 54 is composed of an elastically flexible plastic which allows the remainder of the stroke of the magnet armature 21 into the closed position of the first seat valve 30 to proceed without significant resistance after the sealing knife edge 55 has struck the pole core 13.

The valve 10 is intended, in particular, for use in slip-controlled hydraulic brake systems of motor vehicles. In conformity with the brake system illustrated in FIG. 1 of DE-39 34 771 C1 mentioned at the outset, it is to be arranged as an inlet valve in a brake line between a brake master cylinder and a wheel brake cylinder. The pressure-medium inlet formed by the stepped hole 28 is then connected to the brake master cylinder and the transverse hole 34 is connected as a pressure-medium outlet to the wheel brake cylinder. The valve 10 can be bypassed by a return line which starts from the brake line on the same side as the wheel brake cylinder and re-enters the brake line on the same side as the brake master cylinder. The significant elements in the return line are an outlet valve and, downstream of the latter, a return pump. A non-return valve 58 is expediently arranged between the pressure-medium outlet and the pressure-medium inlet in parallel with the valve 10 to bypass the first seat valve 30, this non-return valve permitting unrestricted return flow from the wheel brake cylinder to the brake master cylinder when the brake master cylinder is relieved of pressure.

The operation of the valve 10 is explained below with reference to the brake system mentioned:

In the case of a braking operation initiated by the driver of the vehicle and not subject to the risk of lock-up, the valve 10 assumes its illustrated rest position, i.e. the first seat valve 30 is open, as is the second valve 51. The pressure generated by actuation of the brake master cylinder brings about a pressure rise in the wheel brake cylinder by displacement of partial quantities of pressure medium in the brake line. As explained with reference to FIG. 2 and indicated by means of arrows, the pressure medium displaced enters the valve seat 29 from the stepped hole 28 and, flowing around the closing member 14, leaves it as a first partial volume flow in the form of a pressure-medium jet shaped like a hollow cone. This does not cause any significant back pressure in the valve subchamber 43 since this is connected to the pressure-medium outlet by the first pressure-medium passage 45, the second pressure-medium passage 48, the pressure-medium-transmitting connection between the control chamber 46 and the balance chamber 51 and the open second seat valve 51. The pressure medium which enters the valve subchamber 43 acting as a retaining space leaves the radial gap 39 as a second partial volume flow, essentially reversing its direction of flow as it does so, and flows through the axial gap 40 and the valve chamber 35 to the pressure-medium outlet. In the case of pressure relief from the direction of the brake master cylinder, the pressure medium flows through the axial gap 40 and the open first seat valve 30 in the opposite direction, towards the brake master cylinder, and through the non-return valve 58 arranged in parallel with the valve 10.

In the case of a braking operation involving the risk of lock-up, the valve 10 is switched by excitation of the solenoid 17 into the working position, in which the first seat valve 30 is transferred to its closed position by displacement of the magnet armature 21 counter to the force of the return spring 31. After approximately half the working stroke of the magnet armature 21, the second seat valve 51 has also shut off the connection between the control chamber 46 and the balance chamber 49. At the same time, the outlet valve in the return line (see FIG. 1 in DE 39 34 771 C1) is switched into the open position and the return pump is put into operation. By removing partial quantities of pressure medium from the wheel brake cylinder and pumping them back to the brake master cylinder, pressure is reduced at the wheel brake and the risk of lock-up is reduced. In the phase for pressure maintenance in the wheel brake cylinder which follows a pressure reduction, the valve 10 remains in the working position, while the outlet valve in the return line is switched into the closed position.

For the pressure build-up in the wheel brake cylinder, the outlet valve remains in the closed position, while the valve 10 is no longer excited. This causes a displacement of the magnet armature 21 towards the control chamber 46 due to the action of hydraulic forces and of the return spring 31, with the result that the closing member 24 begins to free the valve seat 29 and the first seat valve 30 is opened. Due to the pressure reduction in the wheel brake cylinder, there is a pressure drop between the inlet side and the outlet side of the first seat valve 30. The lower, outlet-side pressure also takes effect in the balance chamber 49 via the second pressure-medium passage 48. During the opening movement of the magnet armature 21, the back pressure in the valve subchamber 43 generated by the continued flow of pressure medium from the brake master cylinder side additionally comes into effect in the control chamber 46 via the first pressure-medium passage 45 since the second seat valve 51 keeps the connection between the control chamber 46 and the balance chamber 49 closed. The second seat valve 51, which remains closed during part of the return stroke of the magnet armature 21, thus prevents pressure equalization between the control chamber 46 and the balance chamber 49. Since the magnet armature 21 is not pressure-balanced, it is subject to a force which acts in the opposite direction to the return spring 31 and causes the valve tappet 22 of the magnet armature 21 to assume a position between the closed position and the open position of the first seat valve 30. The resulting reduction in the cross section of flow of the first seat valve 30 brings about a restriction of the flow of pressure medium, with a slower pressure rise in the wheel brake cylinder. Given a sufficient pressure drop, the valve 10 adjusts the flow rate to a substantially constant level because a higher differential pressure results in a higher back pressure with a consequent reduction in the cross section of flow at the first seat valve 30 and vice versa. As the pressure drop dies away, the back pressure in the valve subchamber 43 also decreases. The return spring 31 brings the magnet armature 21 back into its rest position, in which the second seat valve 51 assumes its open position. The valve 10 now exposes its entire cross section of flow in the first seat valve 30 for the following normal braking operation. If, given a reduced cross section of flow of the first seat valve 30, however, the braking operation is aborted by relief of the brake master cylinder, the pressure medium can also flow off out of the wheel brake cylinder without delay through the non-return valve 58.

Figure 4:
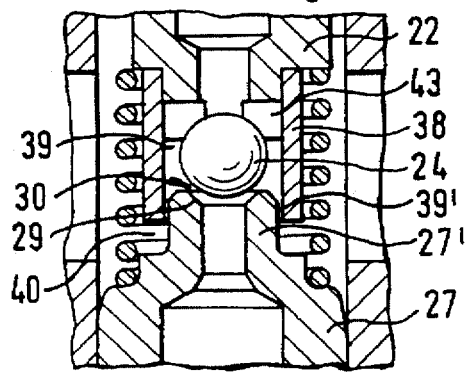
FIG. 4 shows a variant of the seat valve shown in FIG. 2.

The sensitivity of the valve 10 for smaller pressure drops can be increased by means of the variant, illustrated in FIG. 4, of the first seat valve 30 with the baffle element 38. In this refinement, the valve body 27 is provided with a stud-like extension 27' which points towards the valve tappet 22. This extension 27' has the valve seat 29. The baffle element 38 is extended axially beyond the closing member 24 and surrounds the extension 27', forming a second radial gap 39'. The first radial gap 39 and the axial gap 40 are likewise present in this variant. The second radial gap 39' causes an increase in the back pressure in the valve subchamber 43 compared with that in the first embodiment which was described above.

The foregoing relates to preferred exemplary embodiments of the invention, it being understood that other variants and embodiments thereof are possible within the spirit and scope of the invention, the latter being defined by the appended claims.

What is claimed is:

1. An electromagnetically actuated valve (10), for slip-controlled hydraulic brake systems in motor vehicles, which comprises:

a magnet armature (21) is accommodated in longitudinally movable fashion in a closed valve dome (14), the valve dome (14) is surrounded by a solenoid (17), emanating from the magnet armature (21) is a valve tappet (22) with a closing member (24) arranged at an end remote from the armature, a valve body (27) with a valve seat (29) as a pressure-medium inlet is secured in a housing (11) of the valve (10), with the solenoid (17) unexcited, a return spring (31) raises the closing member (24) from the valve seat (29) due to the action of said return spring (31), the closing member (24) and the valve seat (29) part of the valve body (27) forms a first seat valve (30) and are situated in a valve chamber (35) which is connected to a pressure-medium outlet of the valve (10), the valve chamber (35) has a valve subchamber (43) which acts as a retaining space and from there emanates a first pressure-medium passage (45) that leads to a control chamber (47) situated between a valve dome end (47) of the magnet armature (21) which is remote from the closing member and the valve dome (14), a second pressure-medium passage (48) leads from the valve chamber (35) to a balance chamber (49) which is arranged between an end (50) of the magnet armature (21) which is close to the closing member and a pole core (13) of the valve (10), a pressure generated in the valve subchamber (43) is capable of bringing about a force in the control chamber (46) that acts counter to the force of the return spring (31) on the magnet armature (21) and as a result due to the force, the seat valve (30) assumes a partially closed position which differs from its rest position, a pressure-medium-transmitting connection along the circumference of the magnet armature (21) is provided between the control chamber (46) and the balance chamber (49), the pressure-medium-transmitting connection is controlled by a second seat valve (51), in a rest position and during a first partial stroke of the magnet armature (21) following this rest position, the pressure-medium transmitting connection is open, in the working position and during a second partial stroke of the magnet armature (21) following the working position, the pressure-medium-transmitting connection is closed by the second seat valve (51).

2. The valve as claimed in claim 1, wherein a closing element (54) which is elastically flexible in an axial direction and which interacts with the pole core (13) of the valve (10) as a second valve seat is mounted on the magnet armature (21).

3. The valve as claimed in claim 2, wherein the closing element (54) is a straight hollow cylinder which is made of plastic, is mounted on the circumference of the magnet armature (21) and projects beyond an end (50) of the magnet armature (21) close to the closing element by about half the stroke length of said magnet armature (21).

4. The valve as claimed in claim 3, wherein the closing element (54) is mounted on the magnet armature (21) with a press fit in an area remote from the pole core and in axially movable fashion in the remaining area.

5. The valve as claimed in claim 1, wherein the closing element (24) of the first seat valve (30) is of spherical design at least on the first valve-seat side and is surrounded to within a short distance of the valve body (27) by a sleeve-shaped baffle element (38) arranged on the valve tappet (22), coaxially with the valve tappet, such that a pressure-medium jet emerging from the first valve seat (29) enters the gap (39) between the closing element (24) and the baffle element (38), and that a pressure-medium-transmitting connection with the first pressure-medium passage (45), which connection is screened off from the valve chamber (35) starts from this gap (39).

6. The valve as claimed in claim 5, wherein the first valve seat (29) of the first seat valve (30) is arranged in a stud-shaped extension (27') of the valve body (27), and this extension (27') is overlapped at the circumference by the baffle element (38) of the valve tappet (22).

7. A valve as claimed in claim 5 wherein the first seat valve is conical.

* * * * *